United States Patent [19]

Girguis

[11] Patent Number: 5,307,912
[45] Date of Patent: May 3, 1994

[54] SLIP CLUTCH

[76] Inventor: Sobhy L. Girguis, Magdalenenstrasse 19, 5210 Troisdorf 14, Fed. Rep. of Germany

[21] Appl. No.: 944,869
[22] Filed: Sep. 14, 1992

[30] Foreign Application Priority Data

Sep. 13, 1991 [DE] Fed. Rep. of Germany ....... 4130471
Jul. 9, 1992 [DE] Fed. Rep. of Germany ....... 4222574

[51] Int. Cl.⁵ .............................................. F16D 7/08
[52] U.S. Cl. .............. 192/56 R; 192/109 R; 464/36
[58] Field of Search ......... 192/56 R, 109 R; 464/36, 38

[56] References Cited

U.S. PATENT DOCUMENTS 4,199,964  4/1980  Grey ...................... 464/36

FOREIGN PATENT DOCUMENTS 2517910  11/1976  Fed. Rep. of Germany ........ 464/38
8806205  8/1988  Fed. Rep. of Germany .
4-54314  2/1992  Japan ...................... 464/36
450042  4/1975  U.S.S.R. .................. 192/56 R
1198274  12/1985  U.S.S.R. .................. 192/56 R
1581910  7/1990  U.S.S.R. .................. 464/36
2098677  11/1982  United Kingdom ............ 192/56 R Primary Examiner—Richard M. Lorence
Attorney, Agent, or Firm—Herbert Dubno; Andrew Wilford

[57] ABSTRACT

A slip clutch has a first clutch element rotatable about a clutch axis and having a planar surface centered on the axis and formed with at least one axially backwardly open recess and a second clutch element also rotatable about the axis and formed with at least one axially forwardly open window alignable with the recess and having a pair of sides spaced angularly apart by a predetermined distance. A coupling body in the window is axially forwardly engageable in the recess and has an angular dimension substantially smaller than the distance. A pusher body in the window axially backward of the coupling body bears axially forwardly against the coupling body and angularly against one of the sides of the window. A spring unit bears axially forwardly on the pusher body, pressing the pusher body axially forward toward the first element and angularly against the one side of the window, and pressing the coupling body with the pusher body axially forward toward the first element. In other words the coupling and pusher bodies are angularly displaceable in the respective window.

21 Claims, 11 Drawing Sheets

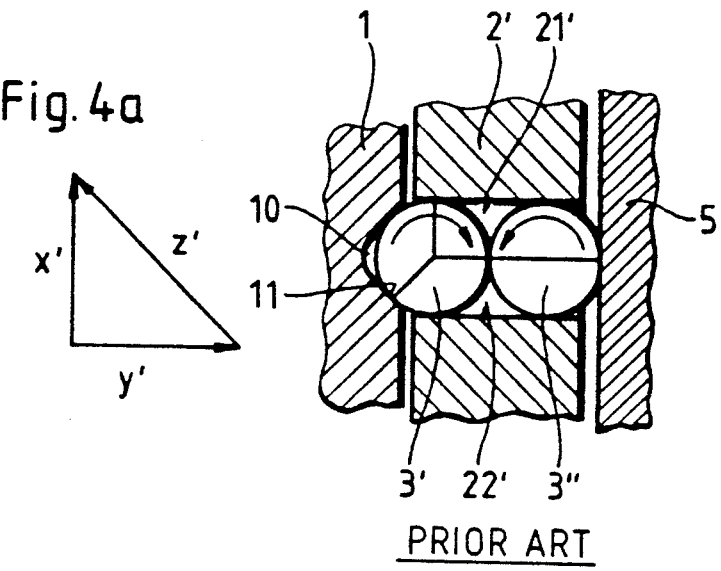
Fig. 4
Fig. 4a
PRIOR ART
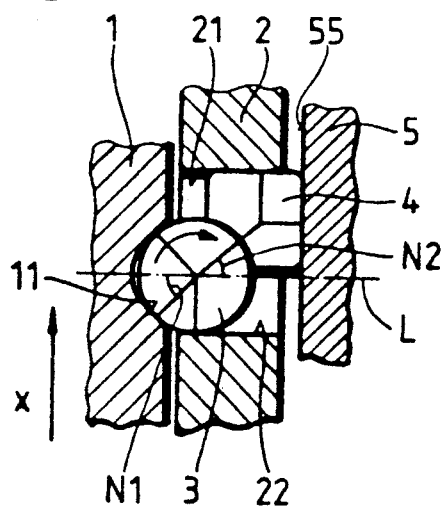
Fig. 5
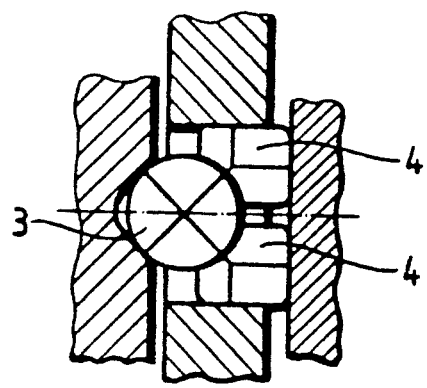
Fig. 6

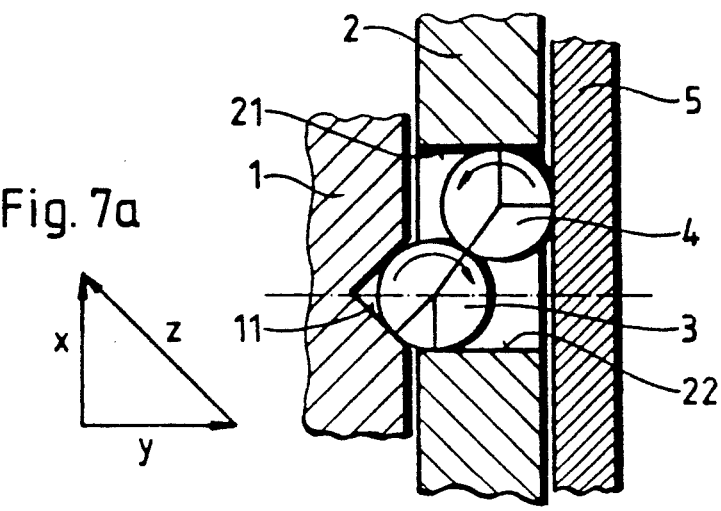
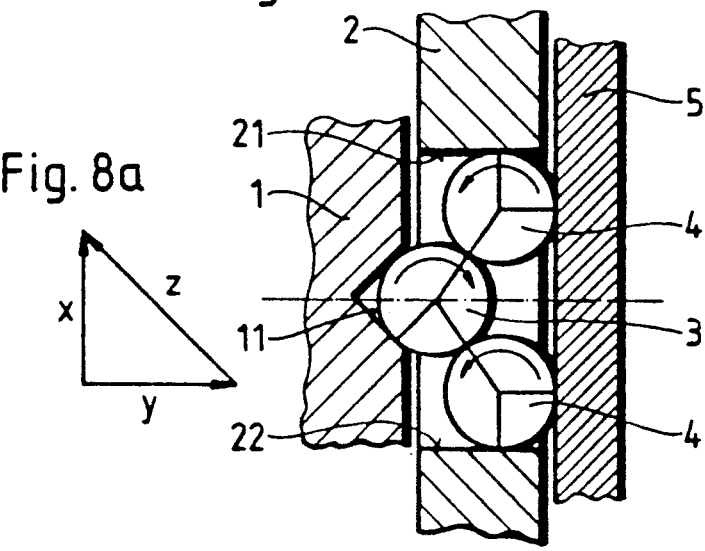

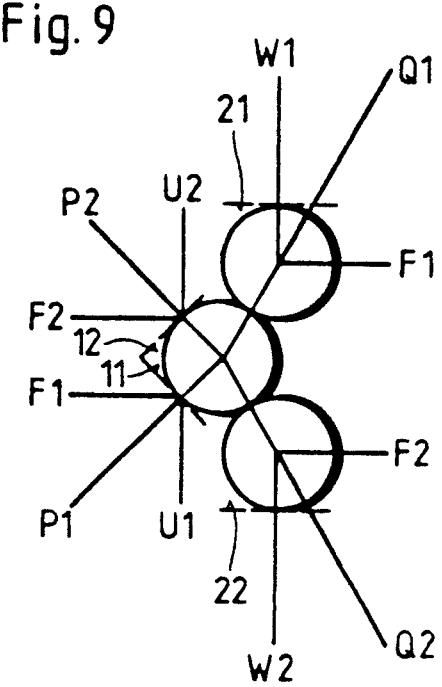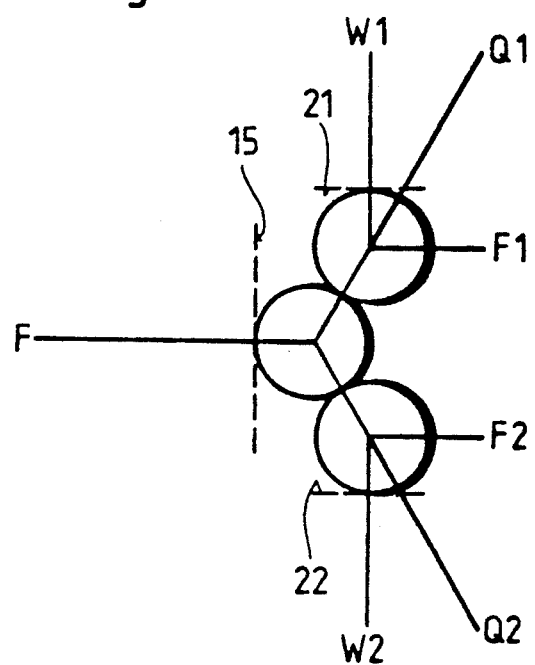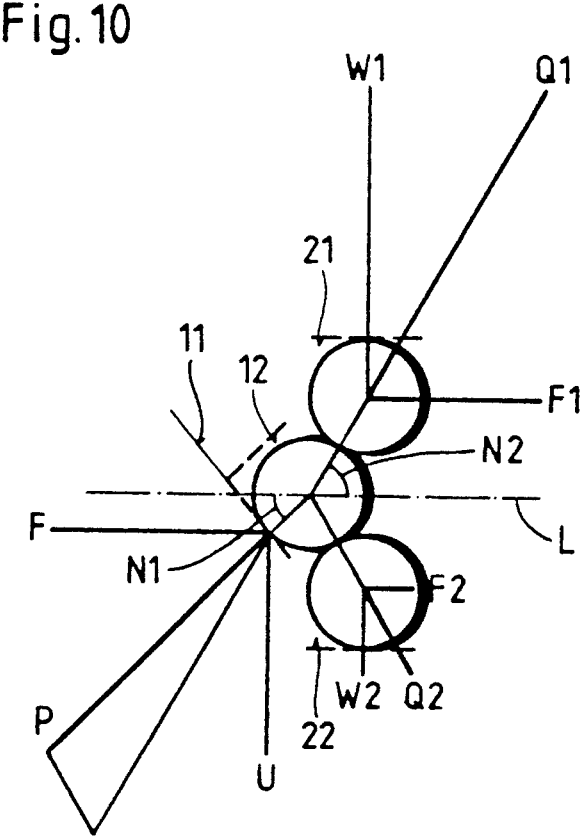

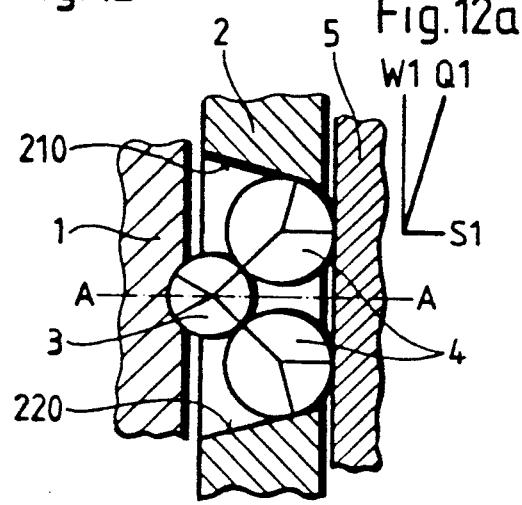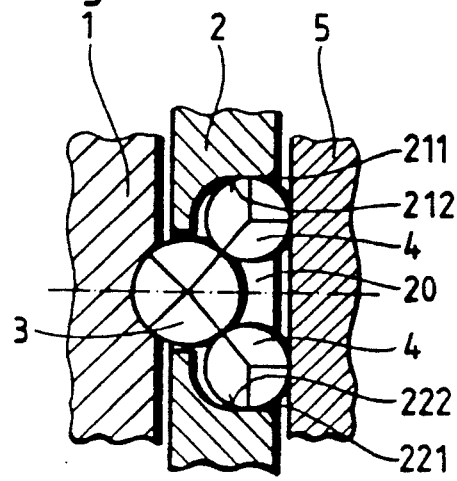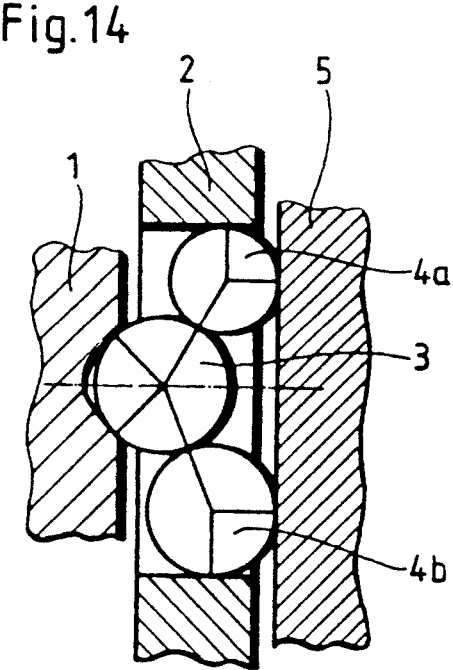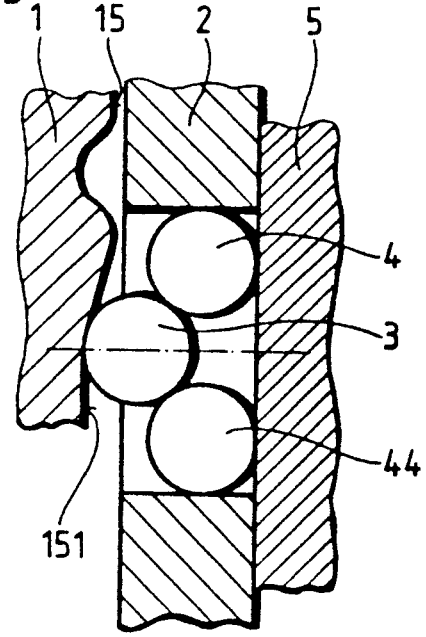

5,307,912

SLIP CLUTCH

FIELD OF THE INVENTION

The present invention relates to a slip clutch. More particularly this invention concerns such a clutch that is used to rotationally couple two adjacent rotatable bodies.

BACKGROUND OF THE INVENTION

German utility model 88 06 205 describes a slip clutch comprising a first clutch element rotatable about a clutch axis and having a planar surface centered on the axis and formed with at least one axially backwardly open recess and a second clutch element also rotatable about the axis and formed with at least one axially forwardly open window alignable with the recess and having a pair of sides spaced angularly apart by a predetermined distance A coupling ball in the window and of approximately the same diameter as the window width is axially forwardly engageable in the recess A pair of pusher balls in the window axially backward of the coupling body bear axially forward against the coupling body under axial pressure from a spring unit to press the coupling ball into the recess and rotationally couple the clutch elements. When torque between the two elements exceeds a predetermined level, the coupling ball is cammed out of the recess and the two elements can rotate relative to each other.

In this system the position of the coupling ball is defined by the position of the window engaging it and by the position of the pusher balls. This results in excessive friction and wear in the clutch. The transmission of torque between the coupling ball and the walls of the window engaging it creates considerable wear. When the windows wear somewhat, the coupling balls can slip under the pusher balls, at a lower torque level allowing the two clutch elements to rotate relative to each other in the sense of a backlash. It is further known to angle the sides of the windows, but this expedient requires a much stiffer spring unit to be employed, increasing the size and cost of the clutch.

OBJECTS OF THE INVENTION

It is therefore an object of the present invention to provide an improved slip clutch.

Another object is the provision of such an improved slip clutch which overcomes the above-given disadvantages, that is which is of relatively simple construction but which will operate surely even when relatively worn.

SUMMARY OF THE INVENTION

A slip clutch has according to the invention a first clutch element rotatable about a clutch axis and having a planar surface centered on the axis and formed with at least one axially backwardly open recess and a second clutch element also rotatable about the axis and formed with at least one axially forwardly open window alignable with the recess and having a pair of sides spaced angularly apart by a predetermined distance. A coupling body in the window is axially forwardly engageable in the recess and has an angular dimension substantially smaller than the distance. A pusher body in the window axially backward of the coupling body bears axially forwardly against the coupling body and angularly against one of the sides of the window. A spring unit bears axially forwardly on the pusher body, pressing the pusher body axially forward toward the first element and angularly against the one side of the window, and pressing the coupling body with the pusher body axially forward toward the first element. In other words the coupling and pusher bodies are angularly displaceable in the respective window.

The positions of the coupling body is therefore exactly established by the window. The pusher body or bodies can shift and still cam the coupling body forward toward the first clutch element, eliminating any play created by wear. In fact wear is automatically compensated for. When only on pusher body is used in each window, one body will engage and wear one side of the window and the other body the other side. For a bidirectional slip clutch two pusher bodies are used angularly flanking the coupling body, and when the sides wear the two pusher bodies just spread a little. In this case the coupling body does not engage either side of its window, so that this coupling body projects relatively far and the first-element recess can therefore have relatively steep flanks. Hence a relatively weak spring unit can be used so that the clutch can be a relatively small device.

The bodies according to the invention are dimensioned such that the pusher body bears angularly in one direction on the coupling body to press same angularly toward one of the sides of the window and bears angularly directly on the other side of the window.

In accordance with this invention the sides of the window diverge axially toward the first element This also makes it possible to use a fairly weak spring unit. Furthermore while the pusher bodies are usually balls or rollers, they also can be constituted as blocks slidable in the respective window. Such slidable pushers subject the windows and the coupling bodies to substantially less surface pressure than rolling pushers. When the pushers are constituted as rollers, however, the coupling body is much less likely to create friction as rolling motion will predominate.

According to another feature of the invention the recess has two angularly spaced flanks against which the coupling body bears and the flanks are angled and the bodies are dimensioned such that the coupling body bears angularly on one flank of the recess in a direction forming with the an axis-parallel line through the center of the one body an angle that is smaller than the angle formed between line and the direction the coupling body bears on the pusher body. Otherwise the coupling bodies could first at a first torque slip under the pusher bodies and then at a second higher torque be raised by the flanks of the recess.

When the pusher body is a body of revolution rotatable about an axis generally radial of the clutch axis the system can work with line contact. Thus surface pressure is somewhat spread out and the service life of the clutch is enhanced. Normally the bodies are an offer conforming contours, ensuring this line contact with each other and with the sides of the windows.

As mentioned above in a bidirectionally symmetrical clutch there is another such pusher body in each window axially backward of the coupling body and bearing axially forwardly against the coupling body and angularly against the other side of the window. This gives extra regions of contact to transmit the spring force to the coupling body. The pusher bodies of circular section can be of different diameters. When the first element is formed with a plurality of such recesses angularly spaced about the axis and the second element is formed with a plurality of such windows angularly spaced about the axis and each provided with a respective coupling body and two respective pusher bodies it is possible for there to be some angular alignment problems. This can easily be rectified by using different sizes of pusher balls.

The slip clutch according to the invention normally has a pressure plate engaged axially by the spring unit and having a face engaging the pusher body. Axially extending interengaging formations on the pressure plate and on one of the clutch elements rotationally couple the pressure plate and one clutch element together. The other clutch element has a face confronting the face of the pressure plate. An axially projecting tooth on one of the faces and an axially open pocket on the other of the faces engageable over the tooth can serve Such an arrangement can also be effective to ensure that the clutch only engages in a predetermined angular position of the clutch elements relative to each other.

It is also within the scope of this invention to provide a guide between the pressure plate and the pusher body for movement of the pressure plate on the pusher body between a pair of axially and angularly offset end positions. Such a guide can, for instance, hold the pressure plate back once the clutch has been forced open by an overtorque, so that only a reversal of the clutch will restore it to operation. In this situation in one of the end positions the pressure plate engages the pusher body and presses the coupling body toward the first element and in the other end position the pressure plate does not push the pusher body axially forward enough to press the coupling body against the first element. The guide means limits the axial travel of the pressure plate on the second element.

The first element is formed with a plurality of such recesses angularly spaced about the axis and the second element is formed with a plurality of such windows angularly spaced about the axis and each provided with a respective coupling body and respective pusher bodies. The surface of the first element is formed with an backwardly open track interconnecting the recesses. The coupling bodies are bodies of revolution and roll in the track. In addition the pressure plate is formed with an annular track centered on the axis and receiving the pusher bodies.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 4 is a view like FIG. 2 of a prior-art clutch;

FIG. 4a a diagram illustrating operation of the FIG. 2 clutch;

FIGS. 5, 6, 7, and 8 are views like FIG. 2 of second through fifth embodiments of the clutch of this invention;

FIGS. 7a and 8a are diagrams illustrating operation of the clutches of FIGS. 7 and 8;

FIGS. 9 through 11 are force diagrams illustrating operation of the of FIGS. 1, 6, and 8;

FIGS. 12 through 15 are views like FIG. 2 of sixth through ninth embodiments of the clutch of this invention, with FIG. 12a showing forces in the system of FIG. 12;

SPECIFIC DESCRIPTION

Figure 1:
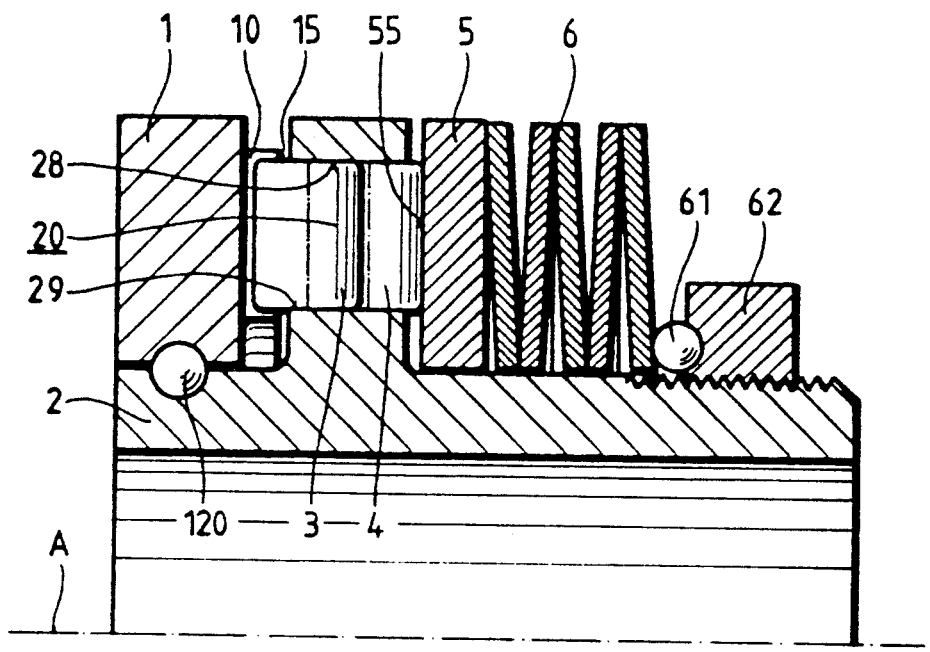
FIG. 1 is an axial section through a first embodiment of a clutch according to the invention in the engaged position.
Figure 2:
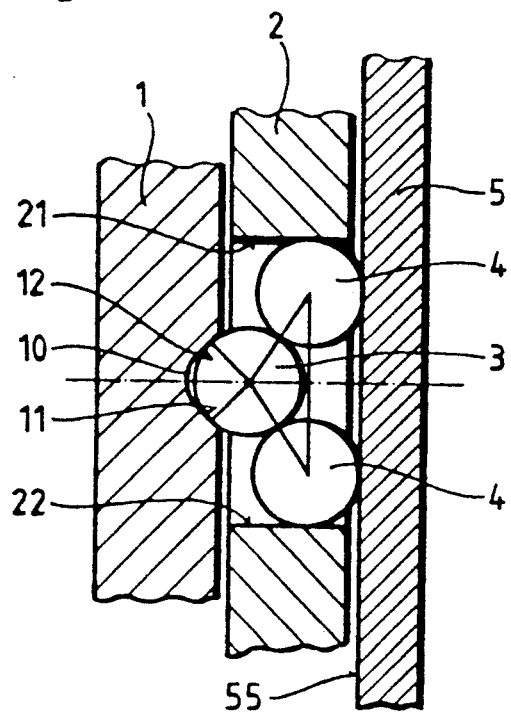
FIG. 2 is a large-scale section taken along a plane perpendicular to of FIG. 1 of the clutch of FIG. 1.
Figure 3:
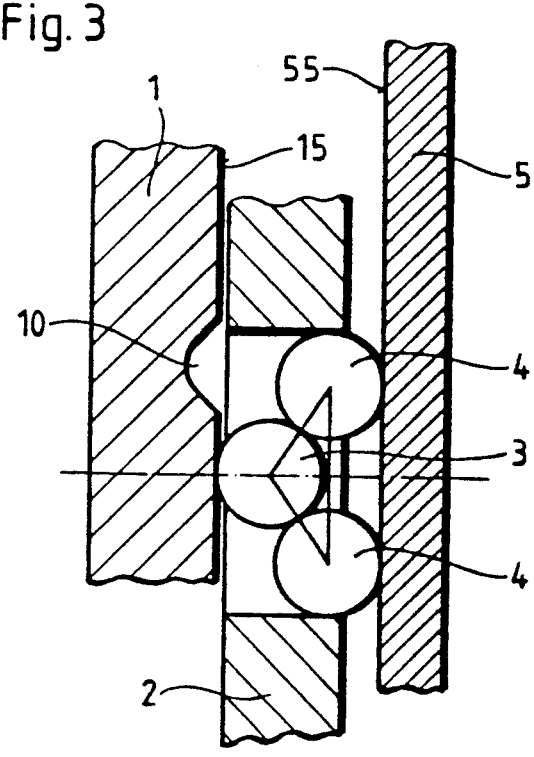
FIG. 3 is a view like FIG. 2 but in the disengaged position.

As seen in FIGS. 1 through 3 a clutch according to this invention basically has an annular clutch element or ring 1 centered on and rotatable about an axis A and riding via a bearing 120 on another clutch element 2 also centered on the axis A and formed with a plurality of axially thoroughgoing and angularly spaced rectangular windows 20. The element 1 has a planar face 15 turned toward the element 2 and formed with an array of angularly equispaced and axially open recesses or pockets 10 having flat angled flanks 11 and 12. A coupling body 3 flanked by two pusher bodies 4 all of cylindrical shape and centered on axes generally radial of the axis A are received in each window 20 and are pressed toward the ring 1 by a face 55 of a pressure plate 5. Springs 6 formed as belleville washers are braced axially between the pressure ring 5 and a bearing 61 in turn braced against a nut 62 threaded onto the element 2.

Each window 20 has a pair of mutually parallel side flanks 21 and 22 extending parallel to a respective radially and axially extending plane, and radially outer and inner flanks 28 and 29 lying in mutually parallel axially and secantally extending planes and bridging the flanks 21 and 22. The angular dimension between the side flanks 21 and 22 is substantially greater than the diameter of the respective coupling body 3.

Torque is thus transmitted from the clutch element 1 to the clutch element 2 via each coupling body 3 and the respective two pusher bodies 4. When the nominal torque rating of the clutch is exceeded, the bodies 3 and 4 are pushed back into the position of FIG. 3 and the two elements 1 and 2 can rotate relative to each other, say with the element 2 stationary and the element 1 continuing to rotate. The coupling bodies 3 are pushed against the spring force out of the recesses 10 and push back the pusher bodies 4. When the next recesses 10 align with the next bodies 3, the clutch can close again, although if the nominal torque is still exceeded, they will just pop out of these recesses again and the relative rotation of the elements 1 and 2 will continue.

FIG. 4 shows a prior-art system wherein the flank 11 carries the greater load. The coupling body 3' only touches the side 21' since any play will be apparent between this body 3' and the side 22'. If the torque in the clutch is reversed, of course this relationship reverses, with the body 3' braced between the flank 10 and the side 22'. If the body 3' is inserted with an interference clutch response varies, heat is generated and the body tends to slip on the flank 11 so as to increase wear and permit backlash.

Wear of the working surfaces of such a prior-art clutch is very high. When overloaded the pusher bodies are for example stationary and the clutch element 1 continues to rotate. Since the normal force on the flank 11 is greater than the peripheral force on the side 21', the friction on the flank 1 is normally somewhat greater. The body 3' thus rolls on the flank 11 clockwise as seen in the drawing and rubs the surface 21' in the direction of the axial lift of the body 3'. If the clutch rotates with a peripheral velocity x as seen in FIG. 4a, this resolves itself into a component z along the flank 11 and y in the axial lifting direction. The body 3' rotates with a peripheral velocity z in the clockwise direction and slides on the side 21' with the same velocity z together with the lifting velocity y. The highest load that is present on actuation is therefore not associated with a rolling movement of the cylindrical body 3' on the side 21, but with a double sliding movement since the peripheral velocity is effective in the lifting direction. Wear is correspondingly intensive so that the service life of the device is reduced.

The pusher body 3'' is not stressed to transmit the rotational forces. When the clutch opens this body 3'' is rotated counterclockwise so that the pressure plate 5 is also moved in direction x'.

FIG. 5 illustrates a roller-type coupling body 3 and a pusher body 4' formed as a sliding block or segment that engages the flank 21 and pressure plate face 55 in surface contact for limited wear. The forces transmitted between the body 3 and the body 4' are inclined at an angle N2 to a line L parallel to the axis A and extending through the center of the body 3, so that this force pushes the bodies 3 and 4' angularly apart. If the element 1 is moved when the clutch opens in the direction x, the body 3 rotates clockwise and rolls on the surface 22.

FIG. 6 shows a second such body 4' for use in a bidirectional clutch. It is also possible to set up the system as in FIG. 5 with the positions of the bodies 3 and 4' alternating from window to window. In fact one of the bodies 4' could be of the sliding type and one of the rolling type in the same window.

In FIG. 7 both bodies 3 and 4 are of the roller type. When the clutch disengages the element 1 moves relative to the element 1 in direction x of FIG. 7a and the coupling body 3 rolls clockwise on the surface 22 in a direction to move it axially forward, and the pusher body 4 rolls on the side 21 counterclockwise. Since the rolling and lifting speeds z and y are not equal, there is a composite friction action. It is, of course, possible to design the system so that both motions are identical or compensate each other out for a purely rolling friction. In this case the pressure plate 5 is also moved in direction x.

The system of FIGS. 8 and 8a is identical to that of FIGS. 7 and 7a, except that two pusher bodies 4 are provided. Once again when the clutch is slipping the plate 5 is rotated in the same direction as the element 1.

FIG. 9 shows the forces in the system when the clutch is closed. The spring force effective via the pressure plate on the pushers 4 is shown at F1 and F2. The coupling body 3 is loaded by the flanks 10 and 11 of the recess 12 with normal forces P1 and P2 along the respective tangents which are respectively broken down into angular and axial components U1, F1, and U2, F2. The normal forces Q1 and Q2 effective between the body 3 and the bodies 4 are reduced to peripheral and axial components W1, W2 and F1, F2.

FIG. 10 shows the clutch at its highest torque, on opening. Only the flank 11 is loaded with the maximal force P which corresponds to an angular force U and an axial force F. The normal force Q1 effective between the coupling body 3 and the upper pusher body 4 reduces to an angular force W1 and spring force F1, and the normal force effective between the coupling body 3 and the lower body 4 reduces to an angular force W2 and a spring force F2. The inclination angle N1 of the force P to the line L is smaller than the angle N2 of the force Q1. Thus the lower body 4 is braced less so that the relative positions of the bodies 3 and 4 remains the same. Friction of course also plays a role here.

FIG. 11 shows the relationships when the clutch is open. The coupling body 3 is supported on the face 15 of the element 1 with the spring force F. Frictional losses ca be reduced by holding this force F down or by using a spring with a negative characteristic, that is one whose stiffness decreases as it is compressed, or special pneumatic or hydraulic biasing can be employed to reduce biasing force when the clutch opens.

In FIGS. 12 and 12a a particular arrangement is shown where the window has flanks 210 and 220 that diverge toward the element 1. As a result an axial component S1 is produced from the force Q1 which is effective toward the element 1 and therefore reduces the spring force. When the clutch opens the bodies 3 and 4 move simultaneously back and the spacing between the pusher bodies 4 becomes smaller. Thus this system can operate with a smaller and weaker spring.

In FIG. 13 the sides 212 and 222 of the window 20 are stepped to form a narrow opening at its front end to retain the parts in place even if the device is rattled. The rear edges of the sides 212 and 222 are chamfered at 211 and 221 so that the spacing between the pusher bodies 4 will increase as the clutch opens, thereby reducing the stroke of the spring. See also FIGS. 27 and 28.

In FIG. 14 the bodies 4a and 4b are of different diameters. In this manner it is possible to compensate for misalignment of the windows 20 with the recesses 10.

The system of FIG. 15 has a face 15 that is formed with a track 151 in which the bodies 3 can roll. When the clutch is open the plate 5 lies against the rear face of the element 2.

Figure 16:
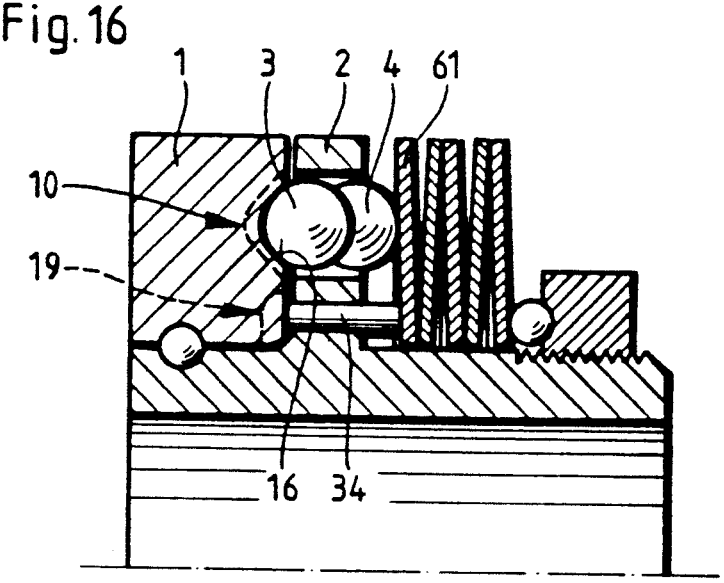
FIG. 16 is an axial section through a tenth embodiment of the inventive clutch.

FIG. 16 shows a clutch like FIG. 1 but in the open or disengaged position. The bodies 3 and 4 are balls and the recess 10 is shown as a dashed line. The coupling body 3 lies in a track 16 that ensures their radial positioning and eliminates the need to accurately guide them in the element 2. A spring 61 bears directly, not via a pressure plate, on the balls 4 and is provided with a tooth-forming pin 34 engageable in a recess 19 of the element 1. There is only one such pin 34 and one such recess 19, so that they can only engage in one angular position of the elements 1 and 2.

Figure 17:
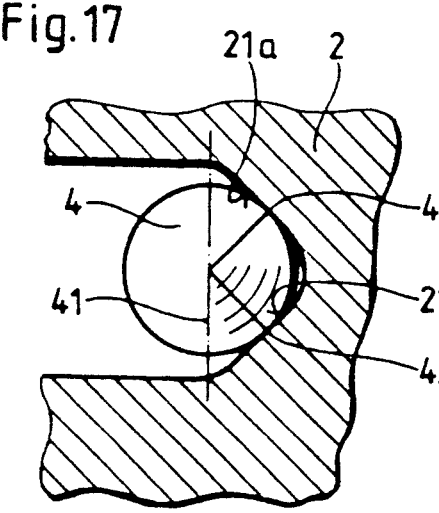
FIG. 17 is a section like FIG. 2 through the FIG. 16 clutch.

FIG. 17 shown a section through the element 2 of FIG. 16 where the pusher body 4 engages the surfaces 21a and 21b at two points 42 and 43. Thus the rolling speed of the pusher body 4 on these surfaces 21a or 21b about the axis 41 is smaller than the peripheral velocity of the outside diameter. With a corresponding selection of contact angle the rolling speed can be reduced to the level of the opening speed y (FIG. 8) so that a purely rolling-friction effect is achieved for uniform action over the life of the clutch.

Figure 18:
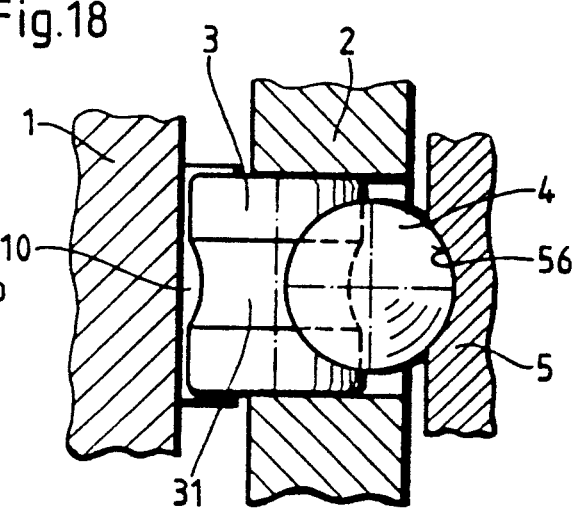
FIG. 18 is a view like FIG. 17 through an eleventh clutch according to the invention.

FIG. 18 is a section through an arrangement where the pusher body 4 is a ball riding in a track 56 formed in the pressure plate and the coupling body is a roller 3' formed with a peripheral groove 31 in which the ball 4 engages. This reduces the rotation speed of the pusher body 4.

Figure 19:
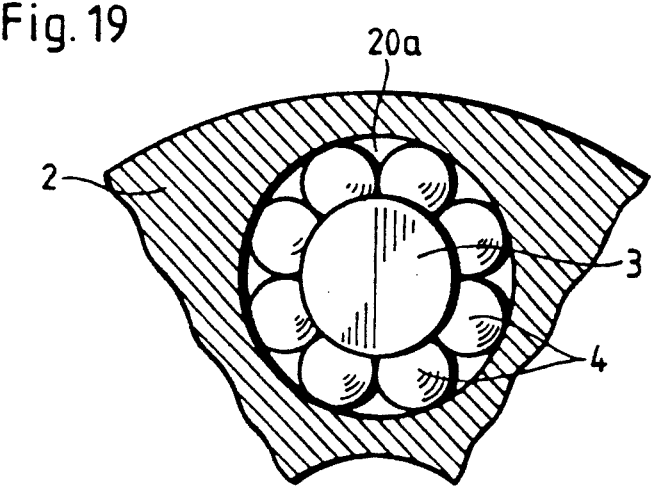
FIG. 19 is a cross section through a detail of a twelfth clutch of this invention.

The system of FIG. 19 has a cylindrical window 20a provided with a large-diameter coupling ball 4 surrounded by an annular array of eight small-diameter pusher balls 3. Thus the ball 3 never contacts the side of the window 20a.

Figure 20:
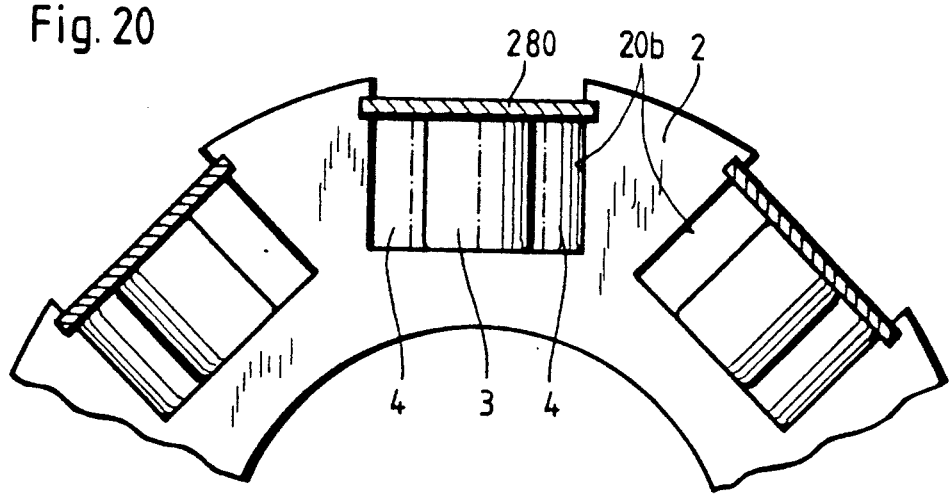
FIG. 20, 21 and 22 are axial end view of details of thirteenth through fifteenth embodiments of the inventive clutch.
Figure 21:
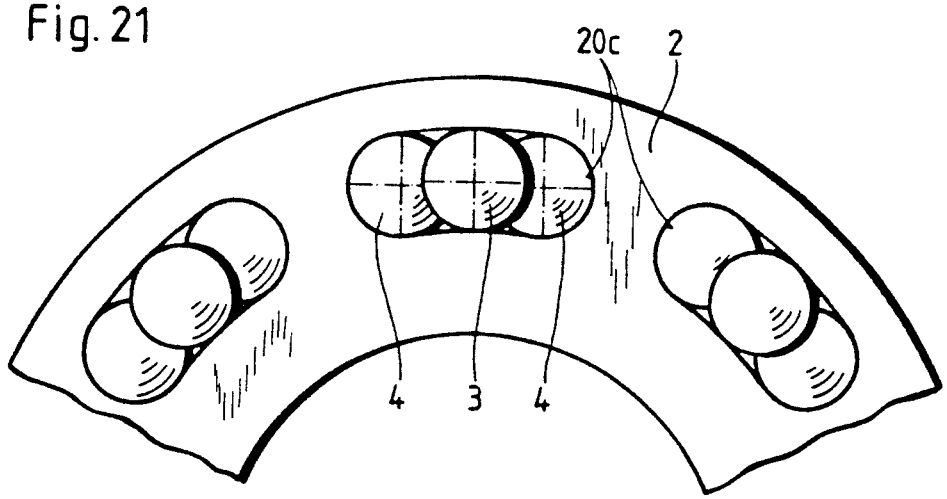
Figure 22:
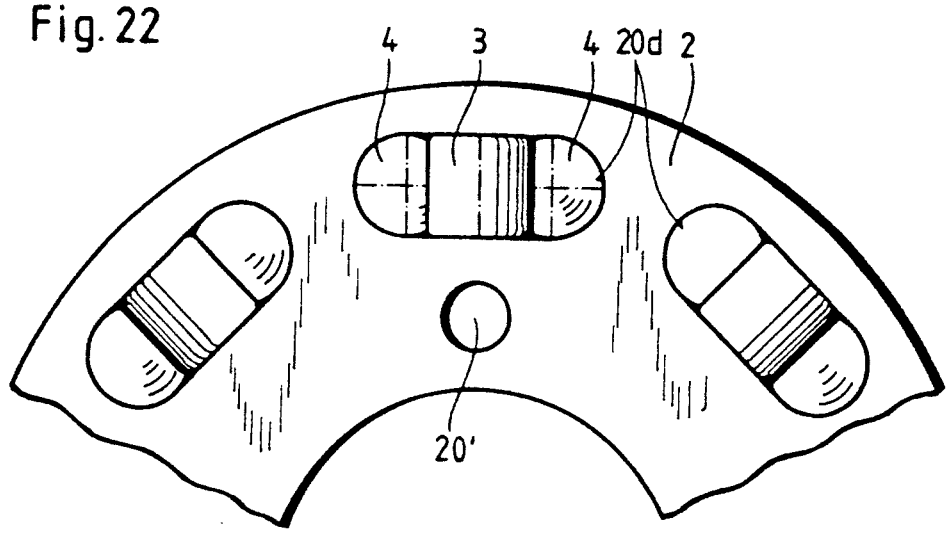

In FIG. 20 the element 2 has rectangular-shaped windows 20b whose outer sides are closed by plates 280. In FIG. 20 balls 3 and 4 are held in windows 20c of round-end arcuate shape. The windows 20d of FIGS. 22 are straight and elongated with rounded ends, and the bodies 4 are balls while the body 3 is a cylinder. Here also a hole 20' for a synchronizing pin such as shown at 34 in FIG. 16 is shown.

Figure 23:
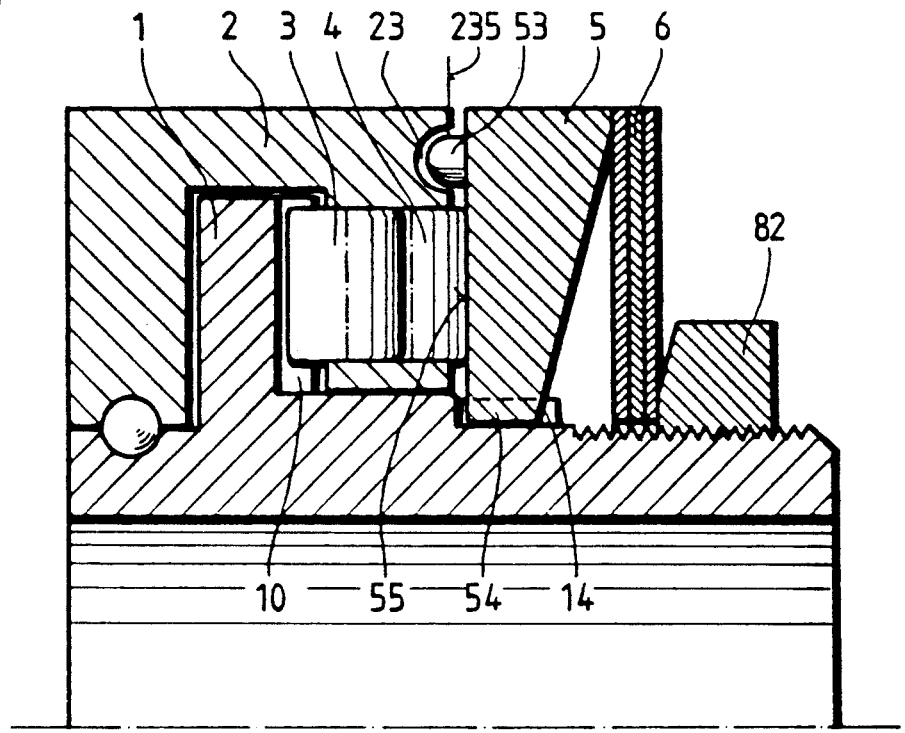
FIG. 23 is an axial section through a sixteenth embodiment of the invention.
Figure 24:
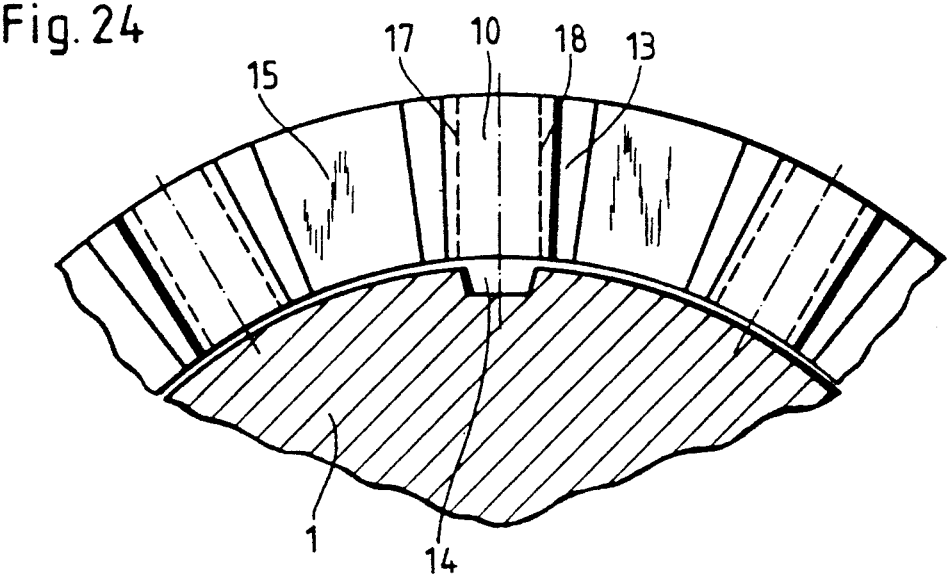
FIG. 24 is an axial end view of a detail of the clutch of FIG. 23.

FIGS. 23 and 24 show a clutch where the pressure plate 5 is formed with an axially extending ridge 54 fitting over an axially extending groove 14 on the element 1 so as to rotationally couple these parts 1 and 5 together. In addition the plate 5 is formed with a tooth 53 that can engage in a recess 23 formed in a back face 235 of the element 2 so that the plate 5 can only move forward to close the clutch when the plates 1 and 2 are in a predetermined position. When the clutch opens and, for instance, the plate 2 stops rotating, the element 1 continues to rotate and the clutch can only close again when the tooth 53 is aligned with the hole 23, presuming of course the clutch torque is not exceeded. Here the spring 6 is braced directly against an adjustment nut 82. The tooth 53 not only prevents the clutch from closing, but also prevents the spring 6 from bearing on the bodies 3 and 4. More than one such tooth 53 and recess 23 can be provided, but in a nonuniform pattern so that they only interfit in one position of the clutch. FIG. 24 further shows how the rollers 3 and 4 engage along lines 17 and 18.

Figure 25:
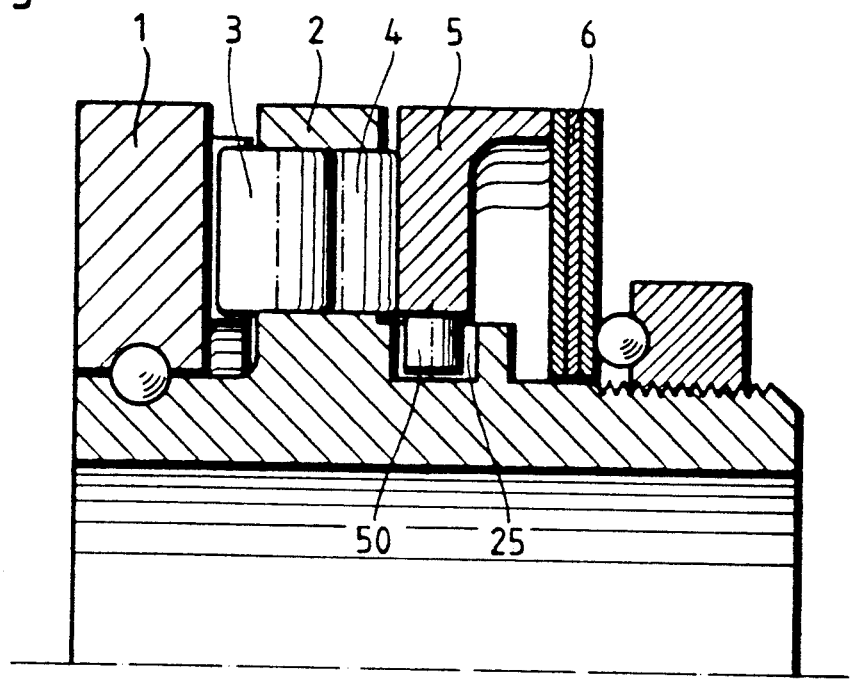
FIG. 25 is an axial section through a seventeenth embodiment of the clutch.
Figure 26:
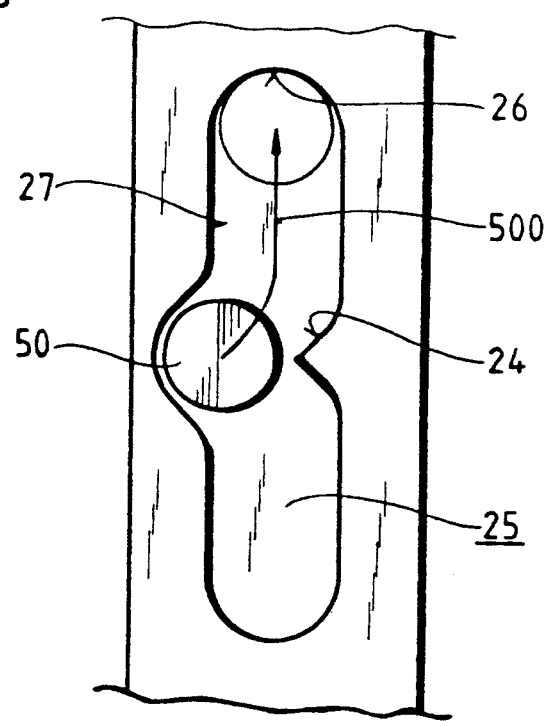
FIG. 26 is a diagrammatic radial view of a detail of the clutch of FIG. 25.

In FIGS. 25 and 26 the pressure plate 5 is provided with a radially inwardly projecting pin 50 that engages in a radially outwardly open guide groove 25 of Y-shape having a front edge 27, outer ends 26, and a rear deflecting point 24. When this clutch is forced open the rolling pusher rollers 4 move the plate 5 axially back as indicated by arrow 500 and then rotate it to leave the pin 50 in the end 26, in which position the spring 6 can no longer push the bodies 3 into the recesses 10 and the clutch is held open. Only if the clutch is reversed can the plate 5 be moved back, in which case the point 24 deflects it back to the forward operative position.

Figure 27:
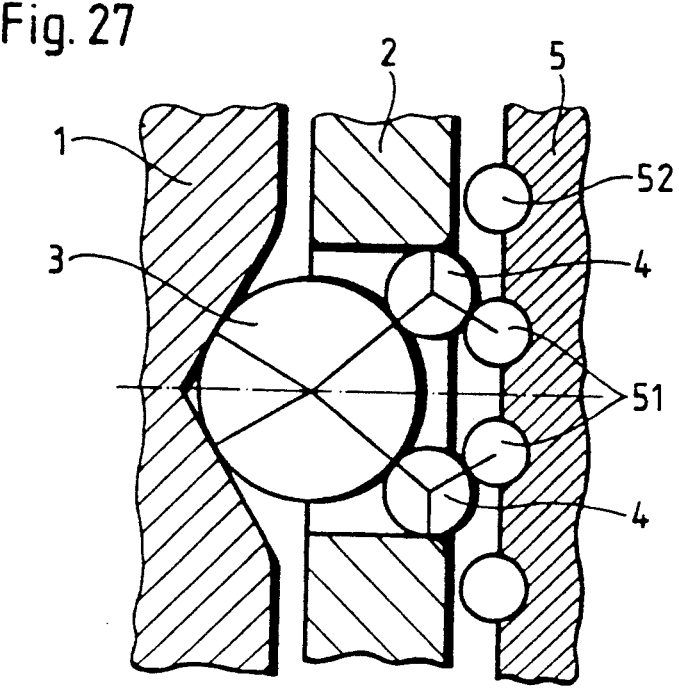
FIGS. 27 and 28 are views like FIG. 2 of an eighteenth clutch in accordance with the invention, respectively in the engaged and disengaged positions.
Figure 28:
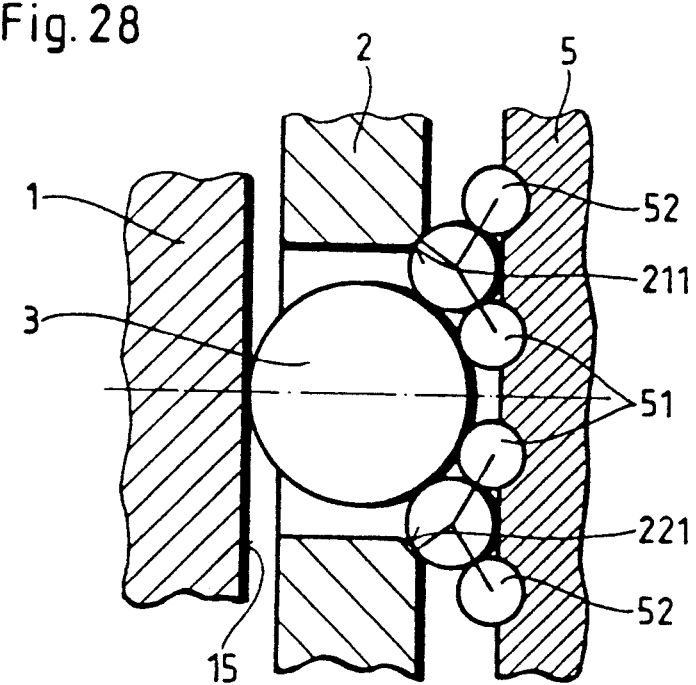

FIGS. 27 and 28 show how the pusher rollers 4 can be engaged by rollers 51 and 52 set in the plate 5. When the clutch is closed as shown in FIG. 27 the rollers 4 each only engage a respective one of the rollers 51, but when open as seen in FIG. 28 they each engage one of the rollers 51 and one of the rollers 52.

Figure 29:
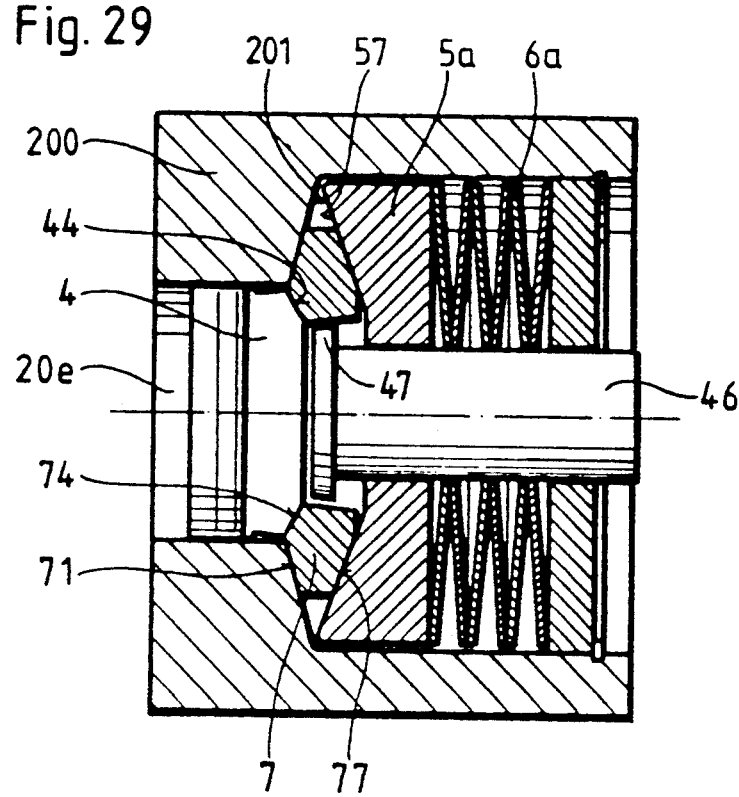
FIGS. 29 and 30 are sectional views through a detail of a nineteenth embodiment of the invention.
Figure 30:
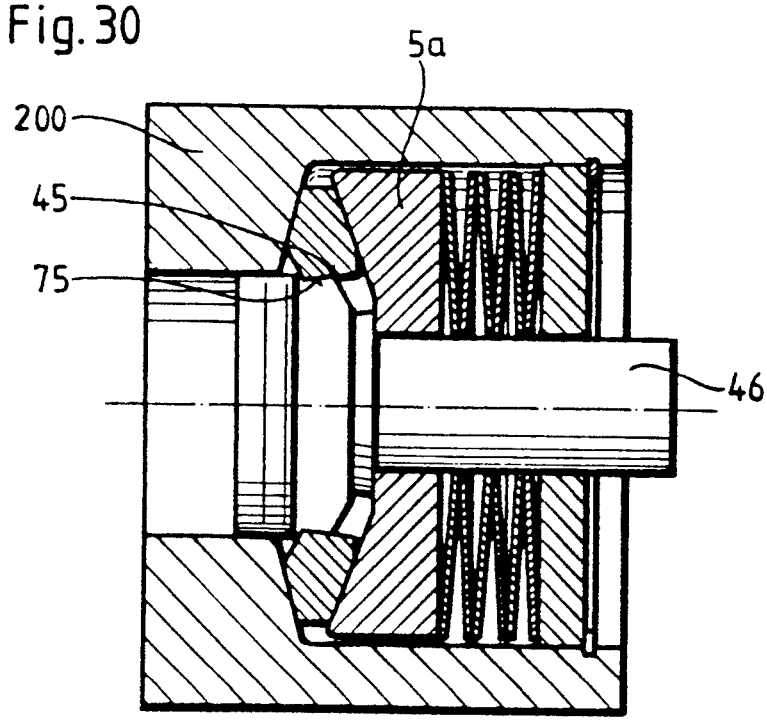

A further embodiment of a part of a clutch is seen in FIGS. 29 and 30 in engaged and disengaged position, respectively. Such units have a housing 200 formed with a window 20e and are set in the flange of a clutch element to coact with another clutch element formed with appropriate coupling-element recesses 10. The window 20e exposes only one of two pusher bodies 4. The housing 200, the pressure plate 5a, and the sliding pusher body 4' (as in FIG. 6) have respective angled surfaces 201, 57, and 44 which coact with respective angled surfaces 71, 74, and 77 of respective wedge bars 7. Between the pressure plate 5a and the housing 200 is a spring assembly 6a surrounding a bolt 46 having two abutments 47. These abutments 47 hold the wedges 7 in place when the body 4 is not present, as prior to assembly.

When the clutch is open as seen in FIG. 30 the body 4 comes between inner surfaces 45 of the wedges 7 and holds them out. The bolt 46 must be pushed in to reengage the clutch.

In general the clutch of this invention operates without play by maintaining the coupling bodies at all times wedged angularly between one side of the respective window and the pusher body. Thus even if the system wears somewhat it remains tight and performs reliably. When two pusher bodies are used, the coupling body is engaged in back of its middle plane so that it can be pushed relatively far out of the window, thereby allowing the seats to be made with steeper flanks. As a result higher torques can be resisted and smaller biasing springs can be used.

I claim:

1. A slip clutch comprising:
   a first clutch element rotatable about a clutch axis and having a planar surface centered on the axis and formed with an axially backwardly open recess;
   a second clutch element also rotatable about the axis and formed with an axially forwardly open window alignable with the recess and having a pair of sides spaced angularly apart by a predetermined distance, whereby on relative rotation of the second element in one rotational direction relative to the first element one of the window sides leads and the other side trails;
   a coupling body in the window, axially forwardly engageable in the recess, and having an angular dimension substantially smaller than the distance;
   a pusher body in the window axially backward of the coupling body and bearing axially forwardly against the coupling body and angularly against the trailing side of the window, the bodies being dimensioned angularly so small relative to the distance that, on relative rotation of the second element in the one rotational direction relative to the first element, the coupling body is spaced from the wholly out of engagement with the trailing side; and
   spring means bearing axially forwardly on the pusher body, pressing the pusher body axially forward toward the first element and angularly against the one side of the window, and pressing the coupling body with the pusher body axially forward toward the first element.

2. The slip clutch defined in claim 1 wherein the bodies are dimensioned such that the pusher body bears angularly in one direction on the coupling body to press same angularly against one of the sides of the window and bears angularly directly on the other side of the window.

3. The slip clutch defined in claim 2 wherein the recess has two angularly spaced flanks against which the coupling body bears and the flanks are angled and the bodies are dimensioned such that the coupling body bears angularly on one flank of the recess in a direction forming with a line parallel to the axis and extending through the center of the coupling body an angle that is smaller than the angle formed between the line and the direction the coupling body bears on the pusher body.

4. The slip clutch defined in claim 1 wherein the sides of the window diverge axially toward the first element.

5. The slip clutch defined in claim 1 wherein the pusher body is a block slidable in the window.

6. The slip clutch defined in claim 1 wherein the pusher body is a body of revolution rotatable about an axis generally radial of the clutch axis.

7. The slip clutch defined in claim 1 wherein the coupling and pusher bodies have mating contours.

8. The slip clutch defined in claim 1, further comprising
another such pusher body in the window axially backward of the coupling body and hearing axially forwardly against the coupling body and angularly against the leading side of the window, the other pusher body also being dimension so small relative to the distance that on rotation of the first element relative to the second element the coupling body is spaced from and wholly out of contact with both sides of the window.

9. The slip clutch defined in claim 8 wherein the pusher bodies are of circular section and of different diameters.

10. The slip clutch defined in claim 1 wherein the first element is formed with a plurality of such recesses angularly spaced about the axis and the second element is formed with a plurality of such windows angularly spaced about the axis and each provided with a respective coupling body and a respective pusher body, the windows and recesses being angularly spaced about the axis such that they are axially alignable in only one relative angular position of the elements.

11. The slip clutch defined in claim 1 wherein the coupling and pusher bodies are of circular section and of different diameters.

12. The slip clutch defined in claim 1 wherein the first element is formed with a plurality of such recesses angularly spaced about the axis and the second element is formed with a plurality of such windows angularly spaced about the axis and each provided with a respective coupling body and respective pusher bodies, the surface of the first element being formed with an backwardly open track interconnecting the recesses.

13. The slip clutch defined in claim 12 wherein the coupling bodies are bodies of revolution and roll in the track.

14. The slip clutch defined in claim 1, further comprising
a pressure plate engaged axially between the spring means and the pusher body and formed with an annular track centered on the axis and receiving the pusher bodies.

15. The slip clutch defined in claim 1, further comprising:
a pressure plate between the spring means and the pusher body;
at least one force-transmitting body between the plate and the pusher body.

16. The slip clutch defined in claim 1, further comprising
bearing means between the spring means and the second element.

17. A slip clutch comprising:
a first clutch element rotatable about a clutch axis and having a planar surface centered on the axis and formed with an axially backwardly open recess;
a second clutch element also rotatable about he axis and formed with an axially forwardly open window alignable with the recess and having a pair of sides spaced angularly apart by a predetermined distance;
a coupling body in the window, axially forwardly engageable in the recess, and having an angular dimension substantially smaller than the distance;
a pusher body in the window axially backward of the coupling body and bearing axially forwardly against the coupling body and angularly against one of the sides of the window;
spring means bearing axially forwardly on the pusher body, pressing the pusher body axially forward toward the first element and angularly against the one side of the window, and pressing the coupling body with the pusher body axially forward toward the first element;
a pressure plate engaged axially by the spring means and having a face engaging the pusher body;
axially extending interengaging formations on the pressure plate and on one of the clutch elements rotationally coupling the pressure plate and one clutch element together, the other clutch element having a face confronting the face of the pressure plate;
an axially projecting tooth on one of the faces; and
an axially open pocket on the other of the faces engageable over the tooth.

18. A slip clutch comprising:
a first clutch element rotatable about a clutch axis and having a planar surface centered on the axis and formed with an axially backwardly open recess;
a second clutch element also rotatable about the axis and formed with an axially forwardly open window alignable with the recess;
a coupling body in the window axially forwardly engageable in the recess;
spring means bearing axially forwardly on the body and pressing the body axially forward toward the first element;
a pressure plate engaged axially by the spring means and having a face engaging the body;
a pressure plate engaged axially between the spring means and the pusher body;
guide means between the pressure plate and the second clutch element for limiting the axial movement of the pressure plate on the second element and for movement of the pressure plate on the second clutch element between a pair of angularly and axially offset positions in one of which the pressure plate presses the coupling body against the first element and into the recess thereof and in the other of which the pressure plate does not push the coupling body axially forward enough to engage the coupling body into the recess of the first element.

19. The slip clutch defined in claim 18 wherein in one of the positions the pressure plate engages the pusher body and presses the coupling body toward the first element and in the other position the pressure plate does not push the pusher body axially forward enough to press the coupling body against the first element.

20. The slip clutch defined in claim 18 wherein the guide means limits the axial travel of the pressure plate on the second element.

21. A slip clutch comprising:
a first clutch element rotatable about a clutch axis and having a planar surface centered on the axis and formed with an axially backwardly open recess;
a second clutch element also rotatable about the axis and formed with an axially forwardly open window alignable with the recess;
a coupling body in the window axially forwardly engageable in the recess;
spring means bearing axially forwardly on the body and pressing the body axially forward toward the first element;
a pressure plate engaged axially by the spring means and having a face engaging the body;
axially extending interengaging formations on the pressure plate and on one of the clutch elements rotationally coupling the pressure plate and one clutch element together, the other clutch element having a face confronting the face of the pressure plate;
an axially projecting tooth on one of the faces; and
an axially open pocket on the other of the faces engageable over the tooth.

* * * * *